United States Patent

[11] 3,623,977

| [72] | Inventor | George W. Reid |
| | | Norman, Okla. |
| [21] | Appl. No. | 49,825 |
| [22] | Filed | June 25, 1970 |
| [45] | Patented | Nov. 30, 1971 |
| [73] | Assignee | FMC Corporation |
| | | San Jose, Calif. |
| | | Continuation-in-part of application Ser. No. 867,174, Oct. 17, 1969, now abandoned. This application June 25, 1970, Ser. No. 49,825 |

[54] SEWAGE TREATMENT PROCESS
13 Claims, 2 Drawing Figs.

[52] U.S. Cl. .................................................. 210/12, 210/152, 210/178
[51] Int. Cl. .................................................. B01d 1/02, C02c 1/02
[50] Field of Search............................................ 210/12, 15, 16, 71, 152, 177–181; 159/3, 28, 48

[56] References Cited
UNITED STATES PATENTS

| 1,516,314 | 11/1924 | Sebald | 159/3 X |
| 2,921,681 | 1/1960 | Toulmin | 210/71 |
| 3,219,579 | 11/1965 | Kranz | 210/71 X |
| 3,296,122 | 1/1967 | Karassik et al. | 210/71 X |
| 3,379,311 | 4/1958 | Kulka | 210/177 X |
| 3,487,015 | 12/1969 | Boester | 210/181 X |

Primary Examiner—Reuben Friedman
Assistant Examiner—Thomas G. Wyse
Attorney—Dressler, Goldsmith, Clement and Gordon ABSTRACT: The method of treating waste materials such as aqueous sewage involves the steps of simultaneously comminuting and oxidizing waste suspended in an aqueous medium while said waste is being held under flow equalizing and Biochemical Oxygen Demand (B.O.D.) equalizing conditions, preheating aqueous waste withdrawn from said oxidizing zone for delivery to a radiant heating zone to a temperature level for pasteurization of said waste and above the vaporization temperature of water at the gas pressure maintained in said radiant heating zone, subjecting at least part of the preheated aqueous waste, introduced into said radiant heating zone under conditions to break up the liquid into droplet form, to direct radiant heat whereby the aqueous portion of said aqueous waste is immediately converted to vapor, the unsatisfied B.O.D. of the solid waste is substantially eliminated and viable material is destroyed, and separately discharging inert ash solids and the mixture of gases and vapor produced in said radiant heating zone.

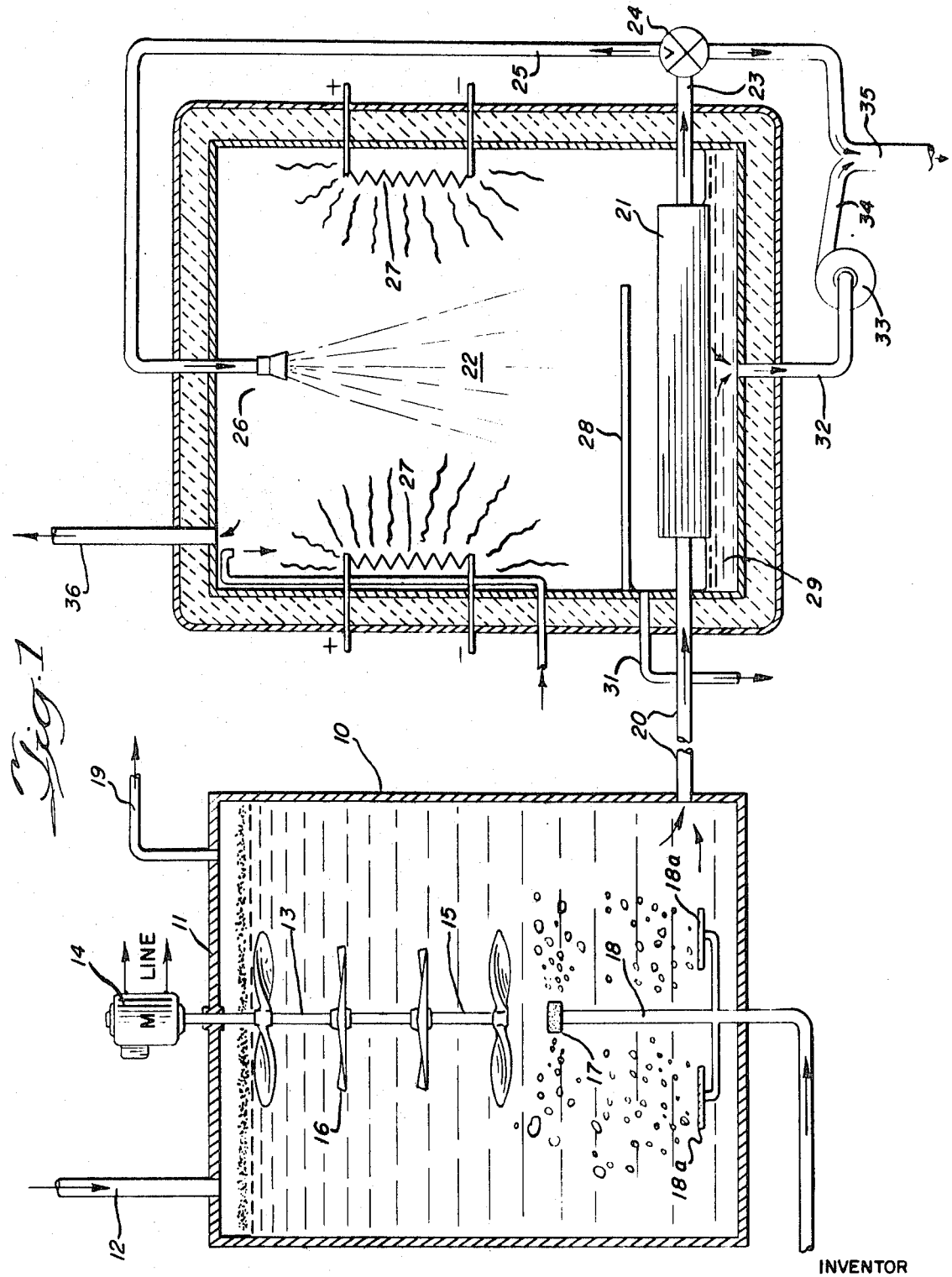

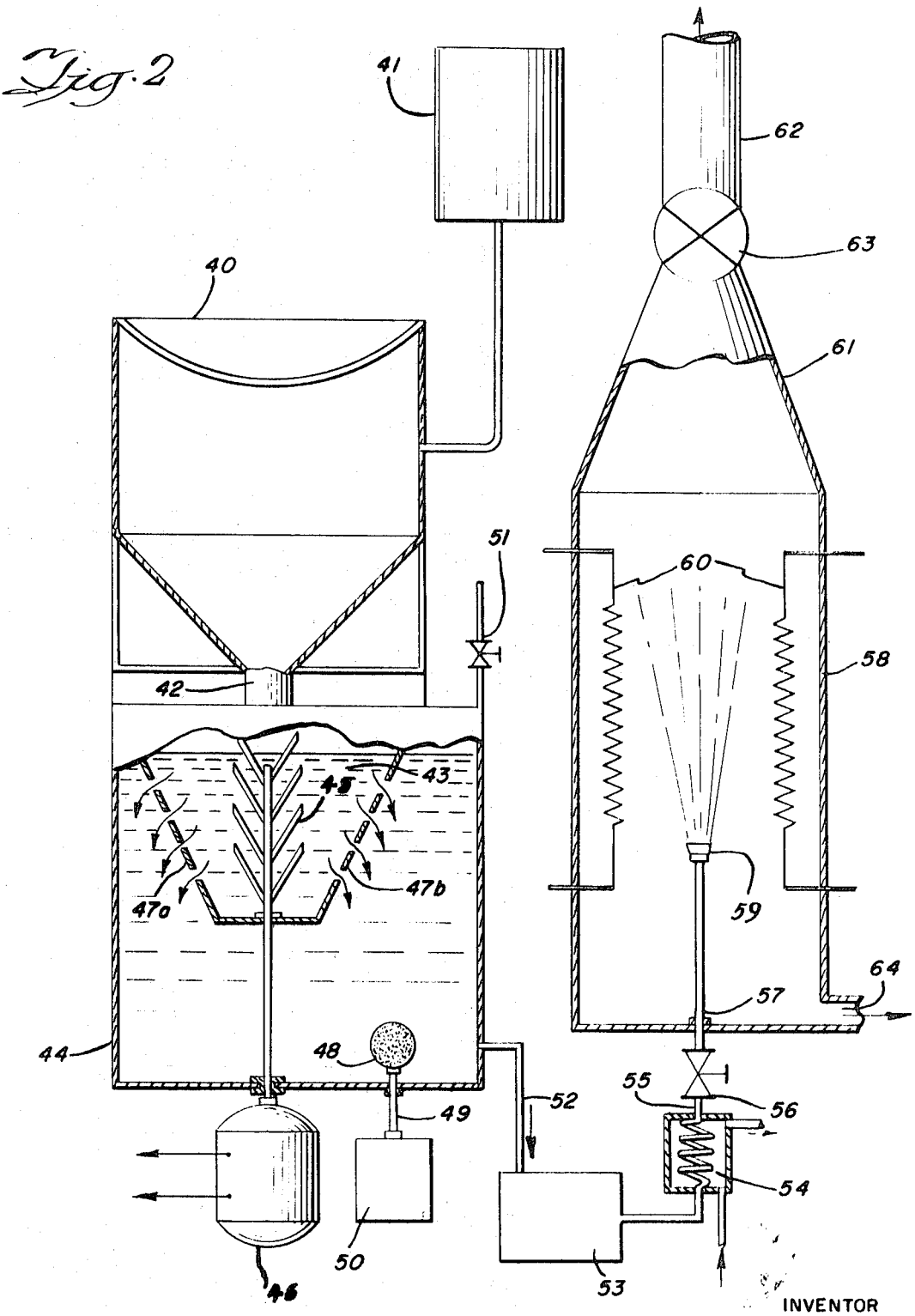

SEWAGE TREATMENT PROCESS

This application is a continuation-in-part of my copending application Ser. No. 867,174, filed Oct. 17, 1969, entitled Sewage Treatment Process, now abandoned.

This invention relates to the treatment of waste materials. More particularly, it relates to apparatus and to a method for the processing of sewage. Still more particularly, it relates to a simplified method for treatment of sewage particularly adaptable to marine usages or other usages where the total volume flow is relatively small.

Briefly, the process of the present invention comprises simultaneously oxidizing and comminuting waste suspended in an aqueous medium while said waste is being held under flow equalizing and Biochemical Oxygen Demand (B.O.D.) equalizing conditions, withdrawing treated aqueous waste continuously or periodically, preheating aqueous waste of partially reduced B.O.D. content withdrawn from said oxidizing zone for delivery to a radiant heating zone to a temperature at the pasteurization level for aqueous waste and above the vaporization temperature of water at the pressure maintained in said radiant heating zone, introducing at least part of the preheated aqueous waste into said radiant heating zone under conditions to break up the aqueous waste into droplet form, subjecting said droplets to direct radiant heat whereby the aqueous portion of said aqueous waste is immediately converted to gas, exhausting gaseous material produced in said radiant heating zone, and separately discharging inert ash solids produced in said radiant heating zone, the part of the pasteurized waste which is subjected to radiant heat being variable depending on the input and output requirements, i.e., overall efficiency, which can and will vary.

Treatment plants for aqueous wastes based upon conventional systems of a size required for individual installations such as camps, ships, etc., have not received wide acceptance because they are too costly to build, considering their capacity, and to maintain and to operate. Incinerators, while they completely eliminate any dangers from micro-organisms, have met with limited acceptance because of high power requirements and potential fire hazards. Small activated sludge-type plants have met with limited acceptance because such plants have not been reduced in functional components, in the need for trained operators or in the length of time required for startup of functional operation, and the like.

One form of sewage treatment offered as an alternative to the activated sludge system is disclosed by Gauvin in U.S. Pat. No. 2,889,874. It teaches a thermal treatment in which an atomized sewage suspension is passed through a chamber where the entire contents are raised to an elevated temperature converting liquids to gases and the gases entrain solids which are carried through the heating zone to a gas vent and the gaseous suspension transferred to solids separation apparatus.

The disadvantage of such a system is the cost of maintaining the high temperatures required. When used for the destruction of raw sewage, malodorous and/or otherwise noxious gaseous and solid products often result.

Now it has been discovered that sewage from installations where periodic flow rates may be high but the total daily flow is relatively small, can be processed in a simplified system providing for efficient reduction in B.O.D. and elimination of viable organisms in a two-stage treatment, the first stage involving simultaneous comminuting of solids and oxidation of aqueous sewage suspension to effect at least partial B.O.D. removal while holding the aqueous suspension under flow and B.O.D. equalizing condition and the second stage involving pasteurizing the first stage effluent by heat exchange and treatment of pasteurized first stage effluent introduced into a chamber under conditions to effect instant vaporization of at least part of the liquid and discharge of the balance of the liquid in droplet form.

More in detail, the process of treating raw domestic or raw industrial waste with or without primary settling, comprises simultaneously subjecting the raw waste to oxidizing action by introducing quantities of gas establishing an excess of dissolved oxygen over that required for satisfaction B.O.D. requirements and subjecting the solids of the waste material to disintegrating force in the presence of said excess of dissolved oxygen, for example, a force created by a high-speed rotor element, whereby fresh surface of disintegrated waste solids is continuously exposed for furtherance of rapid oxidation, transferring oxygen-containing treated liquor to a relatively low-temperature preheat zone, delivering at least part of the preheated liquor to a high-temperature heat zone operating, for example, under subatmospheric pressure, wherein the liquid, due to an abrupt change from atmospheric or higher pressure to a lower pressure, atomizes to produce fine particles, radiantly heating said fine particles in said high-temperature heat zone in the presence of oxygen to convert water to steam, to substantially eliminate B.O.D. of the solids, to eliminate solid organic matter through oxidation and to destroy viable materials, and discharging from the system, uncondensed gases and vapors, inert ash solids, any aqueous condensate and any residual pasteurized liquid.

In this process, the comminution of sewage solids in the aeration zone is effected by means of a rotating high-speed unit having a multiplicity of peripherally jagged discs spaced along the vertically positioned shaft. The shaft in order to provide the disintegrating action is operated at speeds up to 10,000 r.p.m., generally in the range between 5,000 to 7,000 r.p.m.

The language "flow equalizing conditions" means that the aqueous medium in the aeration tank receives a variable flow of influent sewage and discharges and aerated aqueous medium at a predetermined constant flow rate. By B.O.D. equalizing conditions is meant the influent sewage of high B.O.D. periodically entering the aeration tank is, due to mixing with a sufficient volume of the aeration tank contents, uniformly distributed so that the B.O.D. of the constant outlet flow liquor is a value resulting from reduction of B.O.D. from an averaged B.O.D. value.

The relatively low-temperature heat treatment zone or preheat zone may be situated inside or outside the second stage heat treatment zone. When, for example, steam is available, the relatively low-temperature heating may be effected in a conventional heat exchanger on the line through which aerated sewage is delivered from the aeration zone to the high-temperature or second-stage heat treatment zone. Alternatively, the low-temperature heat treatment may take place in an area in the bottom of the second-stage heat treatment unit where the heat exchanger may be shielded from direct heat of the radiant heating zone by a baffle and interchange of heat takes place with the gases and vapors discharging from the radiant heat zone. Liquor flows through the heat exchanger at a rate permitting the liquor to reach a temperature which will effect pasteurization and raise the liquor temperature to a level such that flashing of at least part of the liquid in the treated liquor will occur at the spray nozzle for introduction of liquor into the heating chamber. A useful pasteurization temperature is one in the range between about 150° and 210° F.

The high-temperature heating zone may be maintained at any appropriate level of pressure, for example, may be maintained by an exhaust blower in the subatmospheric range between about 5 and 15 pounds per square inch absolute. The pressure is dictated primarily by a correlation, for purposes of obtaining some degree of flashing of water to steam, of pressure with temperature of the liquid suspension coming to the spray nozzle and the quantity of material it is desired to subject to high-temperature heating in a zone of predetermined volume. In this heating zone, generally held under subatmospheric pressure, radiant heat is supplied, for example, by electrical resistance heaters such as "Calrods," to maintain an effective internal gas temperature in the range between about 150° and 815° C.

A heating chamber of the type utilized in treating sewage is generally designed to have the area of highest temperature removed 6 to 24 inches from the spray nozzle to provide time for vaporization of material which is gaseous at temperatures in the above specified temperature range whereby solids are already in a dry state when they enter the area of maximum and destructive heat.

When the liquid from the aeration tank operating with an excess of oxygen over that required for B.O.D. removal after a retention time of between about 15 minutes and 60 minutes passes through the heat exchanger for pasteurization, it is moving in a closed system which is under positive pressure and the oxygen cannot escape.

The portion of the pasteurized liquid which is directed to the heating chamber operating under subatmospheric pressure carries with it oxygen generally in sufficient quantities to effect conversion, i.e., oxidation at elevated temperatures, of organic matter to inert ash. If desired, additional oxygen in the form of air may be introduced into the heating zone, to ensure complete conversion of organic matter to inert ash.

When pasteurized liquid suspension at a temperature of, for example, 75° C., passes through a nozzle designed to produce a hollow cone mist spray and into a zone of subatmospheric pressure of the order of 5 to 15 pounds per square inch absolute, part of the liquid flashes to a vapor, i.e., water to steam, and the balance of the liquid disintegrates into a spray of droplets having an average diameter size in the range between 10 microns and 100 microns.

In the heating zone, heat transfer to the droplets is effected by conduction and radiation. A primary requisite is that the temperature be in excess of the saturation temperature for steam at the prevailing pressure, i.e., that the heating elements supply heat by radiation and convection to the vapors, which in turn transfer to the droplets by conduction and convection the latent heat and heat of vaporization to vaporize liquids passing through the heating zone.

When the liquids are converted to vapors at temperatures in excess of the saturation temperature, the solids become exposed as dry solids subject to heat decomposition or high-temperature oxidation to produce inert ash solids.

Primary factors governing production of inert ash solids are the temperature and the time during which the dry solids remain subject to the highest temperature maintained in the chamber. Temperatures within the heating zone may be maintained within the range between about 150° C. (302° F.) and 815° C. (1499° F.). When pasteurized liquid suspension at a temperature in the range between about 70° C. (158° F.) and 100° C. (212° F.) passes into the chamber through the nozzle, the liquid portion thereof flashes and produces vapors plus small droplets of liquid. The residual liquid in such droplets is vaporized during travel of a distance generally in the range between about 6 inches and 24 inches from the nozzle. After completion of vaporization of liquid, the solids are dry and become subject to the direct effects of the heat. The higher the temperature being maintained, the shorter the chamber length required for conversion or oxidation of organic solids to inert ash. In general, a chamber length of 2 to 8 feet is provided.

Gases and vapors formed in the radiant heating zone may move directly out of the zone without cooling in response to the suction created by a vent blower. The gases and vapors may, if desired, be cooled before discharge to the atmosphere as by passage of the ashes, gases and vapors around a baffle and into contact with heat exchanger pipes insulated from direct radiant heat by said baffle through which passes the liquid to be pasteurized. Gases and vapors so treated may be cooled to a temperature in the range between about 70° C. (158° F.) and 90° C. (194° F. ) and a significant proportion of the water vapors condensed. The ash will accumulate in such an aqueous condensate and may be withdrawn with the condensate for disposal.

When ash and aqueous condensate is mixed with aqueous waste which has only been pasteurized, a waste product is formed which will generally have solids content in the range between about 100 and 150 p.p.m. and a B.O.D. content in the range between about 20 and 50 p.p.m.

Apparatus, including a preferred embodiment, and its method of operation in accordance with the invention, is set forth herein by way of illustration. The capabilities of the invention will be apparent to those skilled in the art from the following description taken in conjunction with the accompanying drawings in which:

FIG. 1 is a schematic elevational view of the aeration tank and heat-treatment chamber with heat exchanger within the chamber.

FIG. 2 is a schematic sectional elevational view of the combination of a toilet, aeration tank and heat-treatment chamber with upward flow of gases through the chamber.

As shown in FIG. 1, the numeral 10 indicates an aeration tank. Aeration tank 10 is rendered liquidtight by a top 11, which may be of welded construction or secured to the sides by suitable securing means, the area of contact with the tank walls being rendered gas and liquidtight by suitable gasket material.

Influent sewage enters tank 10 through a pipe 12. Influent sewage may or may not be subjected to the usual screening, degritting and comminuting operations. Influent sewage, the solids of which are suspendable in aqueous medium, is subjected to comminuting action of a high-speed rotary unit 13 driven by an electric motor 14.

Rotary unit 13 comprises a shaft member 15 having secured thereto a plurality of spaced blade members 16.

Air is introduced into the tank contents through bubble dispersers 17 which are supported by their communication with piping 18 which delivers air from a source under pressure that is not shown. Supplemental air may be introduced through disperers 18*a*. Gas escapes from tank 10 through vent 19.

Aerated liquid material is transferred from tank 10 through conduit 20 to heat-exchange unit 21 in the lower portion of chamber 22. Heated liquid discharges from heat-exchange unit 21 through pipe 23 to flow control means 24. Liquid is directed by control means 24 in one direction through line 25 which terminates near the upper zone of chamber 22 and is provided with a nozzle 26 of suitable design for atomizing the liquid as a finely divided spray. Preferably, the nozzle 26 has a spray pattern which directs the liquid predominately longitudinally of the chamber so that liquid particles do not contact the chamber wall.

The axial length of the chamber 22 also must be great enough, having regard for the cross section thereof, to provide sufficient time for the evaporation of a desired amount of liquid at the temperature provided.

The chamber 22 may be cylindrical in cross section although preferably it is of a square configuration. Chamber 22 is provided with suitable means 27 for heating the chamber, such as "Calrod" elements of a size appropriate for the evaporation of the vaporizable fraction of the material discharging from nozzle 26.

In its lower zone, the chamber 22 is provided with a baffle 28. Gaseous materials are directed by baffle 28 into contact with heat exchanger 20 which effects condensation of at least part of the water vapor formed in the chamber. Condensate is collected in sump 29. Uncondensed vapors are discharged from the lower zone of chamber 22 through exhaust vent 31. Condensate is withdrawn from sump 29 through outlet pipe 32 by pump 33. Pump 33 discharges liquid into conduit 34 which communicates with liquid outlet conduit 35 which receives liquid directed thereto from flow control means 24 for discharge from the system. When operating under reduced pressure, chamber 22 may be provided with piping 36 connecting to a source of vacuum not shown.

Referring to FIG. 2, the numeral 40 indicates the usual water closet which is disposed to receive, for example, human waste products therein. A suitable flush tank 41 is connected to said water closet and disposed thereabove and filled with water or other fluid capable of flushing the waste products from said water closet 40. Water closet 40 empties through drain tube 42 into an initial mixing chamber 43. Mixing chamber 43 is enclosed within a holding and aeration tank 44 and is provided internally with a high-speed mixer-disintegrator 45 driven by an electric motor 46. Mixing chamber 43 has an inverted truncated pyramidal configuration, the sloping sides 47a and 47b thereof being perforate so that the mixing chamber 43 is in direct communication with the interior of holding tank 44.

Air is introduced into the contents of holding tank 44 through bubble dispersers 48 which communicate through piping 49 with a compressor unit 50. Gas escapes from holding tank 44 through drain tube 42 or through vent 51.

Aerated liquid material is transferred from tank 40 through conduit 52 to pump 53. Pump 53 delivers the aerated liquid under pressure to preheater 54. From preheater 54 the liquid passes through pipe 55 to flow control means 56. Heated liquid is directed by control means 56 in one direction through line 57 which terminates near the bottom zone of chamber 58 and is provided with a nozzle 59 of suitable design for atomizing the liquid as a finely divided spray and, if desirable, some of the liquid may be directed in an alternative direction through a branch pipe discharging to the atmosphere. Preferably, nozzle 59 has a spray pattern which directs the liquid predominantly longitudinally of the chamber 58 so that liquid particles will not contact the chamber walls.

The longitudinally directed spray passes between suitable means 60 for heating the contents of the chamber, i.e., droplets and vapors, such as radiant heating elements of a size appropriate for the evaporation in a short time of the vaporizable portion of the material discharging from nozzle 59.

Chamber 58 is constricted at 61 toward its upper end to communicate with an outlet line 62 which conducts the gases and vapors to the point of discharge into the atmosphere. Gases and vapors formed in the radiant heating zone are moved upwardly through the radiant heating zone in response to gas exhaustion at rates which permit inert ash solids to settle to the bottom of the chamber and pass out through line 62 in response to the action of vent blower 63 of a capacity which will maintain the chamber 58 under a pressure slightly less than atmospheric even with the maximum liquid input through nozzle 59.

In its lower zone, the chamber 58 is provided with an outlet 64, of a size for example to receive a withdrawable tray by means of which inert ash collected in the bottom of the chamber may be withdrawn.

Power consumption requirement for the heat treatment depends upon the volume of aqueous sewage to be treated because a major portion of the requirement is utilized in converting liquid water to superheated water vapor. If the volume of sewage to be heat treated in the high-temperature zone is 30 gallons per hour of so-called concentrated sewage obtained by use of recirculating toilets such as are in current use in airplanes, the size of the equipment to heat treat the entire volume of sewage can be markedly reduced and the power consumption will be of the order of one-eighth that required if the same amount of sewage solids were present in a volume of 200 gallons per hour of aqueous sewage of the type which is conventional average per capita flow upon which design of activated sludge plants are usually based.

When sewage in a volume of approximately 200 gallons per hour having a B.O.D. loading of 100 pounds per 1,000 cubic feet of aeration tank volume, a total chemical oxygen demand of about 230 mg./l. (B.O.D. of 150) is introduced into an aeration tank of 3 foot internal diameter and 4 foot length (approximately 28 cubic feet volume) air may be introduced under pressure at a rate of 75 c.f.m. through a gas disperser axially positioned so that undissolved gas will rise and be mixed into the liquid by the action of the rotating blender.

The rotary blender may consist of an axially positioned shaft driven by a 7.5 horsepower electric motor and having four horizontally positioned cutter blades of 8-inch diameter mounted on the shaft with a 6-inch spacing.

Sewage introduced into the aeration tank will have 50 percent of the solids thereof reduced by a rotor operating at speeds of the order of 6,000 to 10,000 r.p.m. to a maximum size of about 60 microns in 5 minutes and 85 percent of the solids reduced to the maximum 60 micron size in 10 minutes.

The retention time for sewage in the aeration tank is approximately 1 hour with a minimum intended retention time of 20 minutes during feed surges. Aerated and comminuted sewage removed from the aeration tank at a flow rate of approximately 12.5 l./min. having a suspended solids content of 170 mg./l., a B.O.D. of 60 mg./l. (B.O.D. of 110 mg./l.) indicates an approximately 40 percent removal of B.O.D. in the aeration tank.

The heating treatment for the aerated sewage utilizes a chamber which is constructed of a steel sheet of 3-foot internal diameter and 4-foot length, closed at the top and bottom. The entire shell is surrounded by an insulation of 8-inch thickness held in place by an aluminum casing.

In the apparatus illustrated in FIG. 1, there is a horizontal baffle approximately 10 inches from the bottom of the chamber, extending approximately 24 inches from the left-hand vertical wall. Between the baffle and the liquid well at the bottom of the chamber are heat-exchanger pipes of a size to pass 13 liters of liquid per minute. Aerated sewage entering the heat exchanger at 50° F. will issue at a temperature of 163° F. due to absorption of heat from gases having a temperature of approximately 750° C. (1382° F.) When approximately one-half of the liquid taken from the aeration tank is being heat treated in the radiant heating chamber. After heat exchange, the uncondensed vapors are discharged from the chamber through an exhaust system by means of which an absolute pressure of approximately 10 pounds per square inch absolute is maintained in the heating chamber.

Six liters per minute of the 13 liters of pasteurized aerated sewage is pumped to a spray nozzle capable of producing droplets of an average particle size of 60 microns, the aqueous sewage upon emergence from the spray nozzle as spray droplets contact gaseous atmosphere maintained at approximately 750° C. (1,382° F.) at its so-called hotspot point approximately 24 inches from the top of the chamber by electrical "resistance heaters" generally of the "Calrod" type having a rating of approximately 250 horsepower.

Auxiliary air is introduced into the chamber at a rate of approximately 2 c.f.m. The air conduit pipe is positioned inside the chamber for part of its length prior to the outlet so that the air enters the chamber at a temperature of approximately 538° C. (1,000° F.).

When the gaseous content of the heating chamber contacts the heat exchanger, most of the water vapors will be condensed and the liquid is accumulated in the condensate sump. The liquid will have a temperature of the order of 185° F. and will contain approximately 70 p.p.m. of suspended solids.

Condensate liquid when mixed with the 7 liters per minute of pasteurized aerated sewage which does not pass through the radiant heating zone produces a dischargeable liquid having a temperature of about 170° F. and averaging 150 p.p.m. of suspended solids and 50 p.p.m. of B.O.D.

I claim:
1. The method of treating sewage which comprises simultaneously oxidizing and comminuting waste suspended in an aqueous medium while said waste is being held under flow equalizing and B.O.D. equalizing conditions, said oxidizing action effecting a partial B.O.D. reduction, withdrawing treated aqueous waste for delivery to a radiant heating zone, preheating aqueous waste withdrawn from said oxidizing zone to a temperature level for pasteurizing said waste and above the vaporization temperature of water at the gas pressure maintained in said radiant heating zone, introducing at least part of the preheated aqueous waste into said radiant heating zone under conditions to break up the liquid into a small particle size form, subjecting the particles to direct radiant heat whereby the aqueous portion of said particles is converted to vapor, the unsatisfied B.O.D. of the solid waste is substantially eliminated and viable material is destroyed, discharging in gaseous form at least part of the mixture of gases and vapors produced in said radiant heating zone, and withdrawing inert ash solids from said radiant heating zone separately from the gaseous material discharged.

2. The method according to claim 1 wherein the oxidizing of waste is for a time necessary to remove up to 40 percent of the B.O.D.

3. The method according to claim 1 wherein the comminuting of waste suspended in the aqueous medium is to an average particle size of about 60 microns.

4. The method according to claim 1 wherein pasteurization raises the temperature of the aerated and comminuted sewage to a temperature in the range between about 70° C. and 100° C.

5. The method according to claim 1 wherein that part of the pasteurized aqueous waste which enters the radiant heating zone is subjected to a temperature in the range between 150° C. and 750° C.

6. The method according to claim 1 wherein that part of the pasteurized aqueous waste is subjected to a subatmospheric pressure in the range between about 5 and 14 pounds per square inch absolute.

7. The method according to claim 1 wherein a supply of air to supplement that introduced with the oxygen-containing treated liquor is vented into the vacuum chamber.

8. The method according to claim 1 wherein aerated aqueous waste is preheated and then is introduced into the bottom of said radiant heating zone, as small particle size droplets, and vapors and gases formed in said radiant heating zone are moved upwardly through said zone in response to gas exhaustion at rates which permit inert ash solids to settle to the bottom of said radiant heat zone.

9. The method according to claim 1 wherein the waste is domestic sewage of 150 mg./l. of B.O.D., 50 percent of the aerated aqueous waste withdrawn from the zone of simultaneous oxidizing and comminuting and pasteurized is subjected to treatment in the radiant heating zone, vapors are condensed in the bottom of the radiant heating zone by heat exchange and the condensate withdrawn from the heating zone is blended with the 50 percent remainder of the pasteurized aqueous waste to produce a dischargeable liquid of less than 150 p.p.m. of suspended solids and less than 50 mg./l. of B.O.D.

10. The method of treating sewage which comprises simultaneously oxidizing and comminuting waste suspended in an aqueous medium while said waste is being held under flow equalizing and B.O.D. equalizing conditions, said oxidizing action effecting a partial B.O.D. reduction, withdrawing treated aqueous waste, subjecting said withdrawn aqueous waste of partially reduced B.O.D. content to heat exchange whereby said aqueous waste is elevated to a temperature which pasteurizes said aqueous waste and raises its temperature above the vaporization temperature of water at the pressure maintained in a radiant heating zone, subjecting at least part of the pasteurized aqueous waste in droplet form to direct radiant heat whereby the aqueous portion of said aqueous waste is immediately converted to a vapor, the unsatisfied B.O.D. of the solid waste is substantially eliminated and viable material is destroyed, and discharging from the system at least part of the aqueous vapors in the form of an aqueous condensate, inert ash solids and any residual amount of pasteurized liquid waste.

11. The method according to claim 10 wherein quantities of oxygen-containing gas are introduced into the waste held under flow equalizing and B.O.D. equalizing conditions establishing an excess of oxygen over that required to satisfy B.O.D. requirements, said radiant heating zone is in a zone maintained under subatmospheric pressure and aqueous waste raised to an elevated temperature by heat exchange flashes as it is introduced into said radiant heating zone, to produce a mixture of water vapor and small liquid particles.

12. Apparatus for treating sewage comprising an aeration tank for accumulation of aqueous sewage, air-dispersing means mounted within said tank, rotary-agitating means positioned in said tank, conduit means for transferring aerated aqueous suspension from said aeration tank to a separate chamber, means for preheating said suspension being transferred, an inlet spray nozzle positioned adjacent one end of said chamber, pump means for delivering preheated suspension to said spray nozzle, radiant heating elements extending longitudinally of said chamber adjacent the walls thereof, exhaust means for withdrawing gases and vapors from an area of said chamber opposite from said spray nozzle, and means for withdrawing ash solids accumulated in the bottom of said chamber.

13. A waste disposal system comprising a water closet for receiving human waste material, an aeration tank connected to said water closet for accumulation of aqueous sewage from said closet, a wall member having ports therein disposed in said aeration tank, said wall member defining first and second compartments in said tank, said first compartment being in position to receive said aqueous sewage, rotary-agitating means mounted in said first compartment, gas-dispersing means mounted in said second compartment for introducing air into the suspension received from said first compartment, conduit means communicating at one end with said aeration tank and at the other end with an area in the interior of and adjacent to one end of a separate chamber, said conduit terminating at said other end in a spray nozzle, means associated with said conduit means for inducing liquid flow therethrough, preheating means associated with said conduit means at a point intermediate of said flow inducing means and said chamber, a branch pipe having an outlet communicating with the atmosphere communicating with said conduit means at a point intermediate of said preheating means and said chamber, flow splitting means in said conduit means adapted to discharge a portion of the liquid flow through said branch pipe, radiant heating elements mounted along the longitudinal walls of said chamber, exhaust means for vapor and gases communicating with an area of said chamber separated from the end of the chamber in communication with said conduit means by the zone bounded by said radiant heating elements, and outlet means for withdrawing inert ash solids accumulated in the bottom of said chamber.

* * * * *